United States Patent

[11] 3,600,675

[72] Inventor Robert P. Grenier
 Newburyport, Mass.
[21] Appl. No. 889,211
[22] Filed Dec. 30, 1969
[45] Patented Aug. 17, 1971
[73] Assignee Western Electric Company, Incorporated
 New York, N.Y.

[54] METHOD AND SYSTEM FOR ADJUSTING ELECTRICAL COMPONENTS USING ALTERNATELY APPLIED SIGNALS
 9 Claims, 10 Drawing Figs.

[52] U.S. Cl. .................................................. 324/57 R,
 29/25.35, 118/9, 324/56
[51] Int. Cl. ...................................................... G01n 27/00
[50] Field of Search .......................................... 324/56, 57;
 29/25.35, 574; 118/9

[56] References Cited
 UNITED STATES PATENTS
 2,178,225 10/1939 Diehl et al. ................... 324/56
 2,794,952 6/1957 Golden et al. ................. 324/57

*Primary Examiner*—Edward E. Kubasiewicz
*Attorneys*—W. M. Kain and R. P. Miller

ABSTRACT: A crystal filter or similar electrical component is adjusted by application to the filter of a characteristic adjusting medium, such as evaporated or sputtered gold, in order to provide a desired differential insertion loss with respect to output signals corresponding to two input signals generated at two frequencies of interest. The two input signals are applied sequentially to the filter with the signal levels of the input signals calibrated to differ by a quantity equal to the desired differential insertion loss. An initial calibration, utilizing a signal attenuator, provides this differential. Treatment then occurs, with the output of the crystal being continuously monitored by a signal amplitude measuring device. An AC monitoring signal, representing the alternating output signal levels corresponding to the sequentially applied input signals, is generated from the signal amplitude measuring device. A phase reversal in the AC monitoring signal is sensed by a phase detector, which generates a control signal to terminate the treatment operation. The phase reversal occurs at the instant that the desired differential insertion loss value is attained.

FIG-6
OUTPUT FROM SWITCH 17
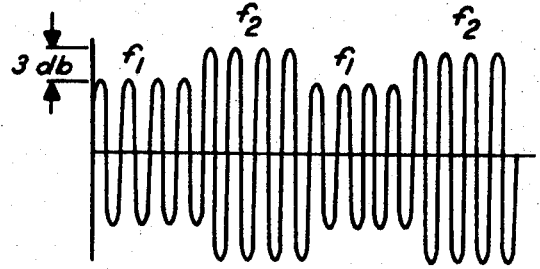
OUTPUT FROM FILTER
(LOSS AT $f_2$ > LOSS AT $f_1$ + 3db ATTENUATION)
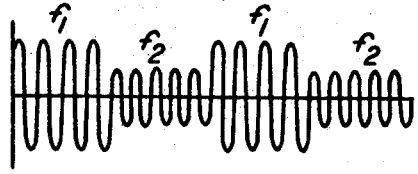
FIG-7
OUTPUT FROM
AMPLITUDE DETECTOR 24
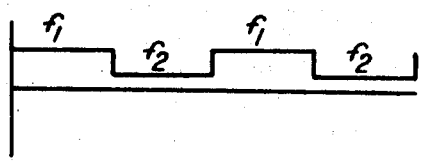
FIG-9
OUTPUT FROM FILTER
(LOSS AT $f_2$ < LOSS AT $f_1$ + 3db ATTENUATION)
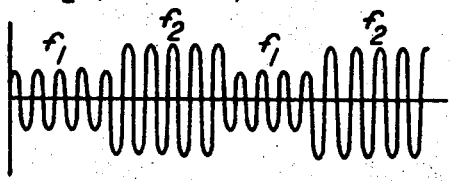
FIG-8
OUTPUT FROM
AMPLITUDE DETECTOR 24
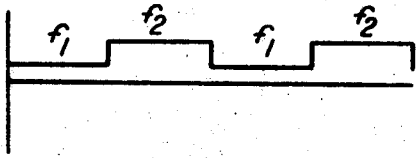
FIG-10

METHOD AND SYSTEM FOR ADJUSTING ELECTRICAL COMPONENTS USING ALTERNATELY APPLIED SIGNALS

BACKGROUND OF THE INVENTION

This invention relates to methods and systems for adjusting electrical components and, more particularly, to methods and apparatus for testing one or more electrical components, such as piezoelectric crystal filters, while adjusting each component so as to provide desired frequency response characteristics to the component.

In the production of piezoelectric crystal filters and similar articles, it may be desired that a given differential insertion loss be provided with respect to output signals corresponding to two input signals at two different frequencies of interest. Ordinarily, a crystal filter unit provides initially a differential insertion loss value departing considerably from that desired. Treatment operations must, therefore, be performed with respect to each filter in order to alter the frequency response characteristics of the filter so as to attain the desired differential insertion loss.

The treatment of a crystal filter to vary the differential insertion loss will normally affect simultaneously the frequency response characteristics of the filter at both frequencies of interest. Monitoring both of these quantities simultaneously, comparing instantaneous values of the quantities and terminating treatment at exactly the correct instant to provide the desired result constitutes a complex operation which would be most difficult for an individual to control. Automatic systems and methods for performing these tasks would, clearly, be most advantageous.

SUMMARY OF THE INVENTION

An object of the invention resides in new and improved methods and systems for testing one or more electrical components, e.g., piezoelectric crystal filters, while adjusting each component so as to provide desired frequency response characteristics to the component.

The invention contemplates adjustment of crystal filters or similar articles by treating each such component with a characteristic adjusting medium, for example, evaporated or sputtered gold for varying the mass and other physical properties of the component. During the treatment operations, the response of the crystal filter or other component to the two frequencies of interest is continuously monitored by an alternating application of signals at the two frequencies to the filter. The methods and systems contemplated by the invention function to terminate automatically the treatment operation when a desired differential insertion loss is attained for the crystal filter.

The invention further contemplates an initial calibration operation wherein the input signals are caused to differ in signal level by a quantity equal to the desired differential insertion loss. The treatment operation, with the alternating application of the signals to the treated crystal filter, follows. An AC monitoring signal, representing the amplitudes of the alternating outputs corresponding to the alternated input signals, is generated. A phase reversal in the AC monitoring signal, indicating that the desired differential insertion loss has been attained, causes a control signal to be generated, terminating the treatment operation. The differential insertion loss is, thus, fixed for the treated crystal at the desired value. The phase reversal provides a simple and reliable indication that the required final condition of the filter has been achieved.

BRIEF DESCRIPTION OF THE DRAWING

FIGS. 6 through 10 are waveforms depicting the operations of various portions of the system of FIGS. 1 and 2 under varying circumstances relating to the operation of these systems.

DETAILED DESCRIPTION

Figure 1:
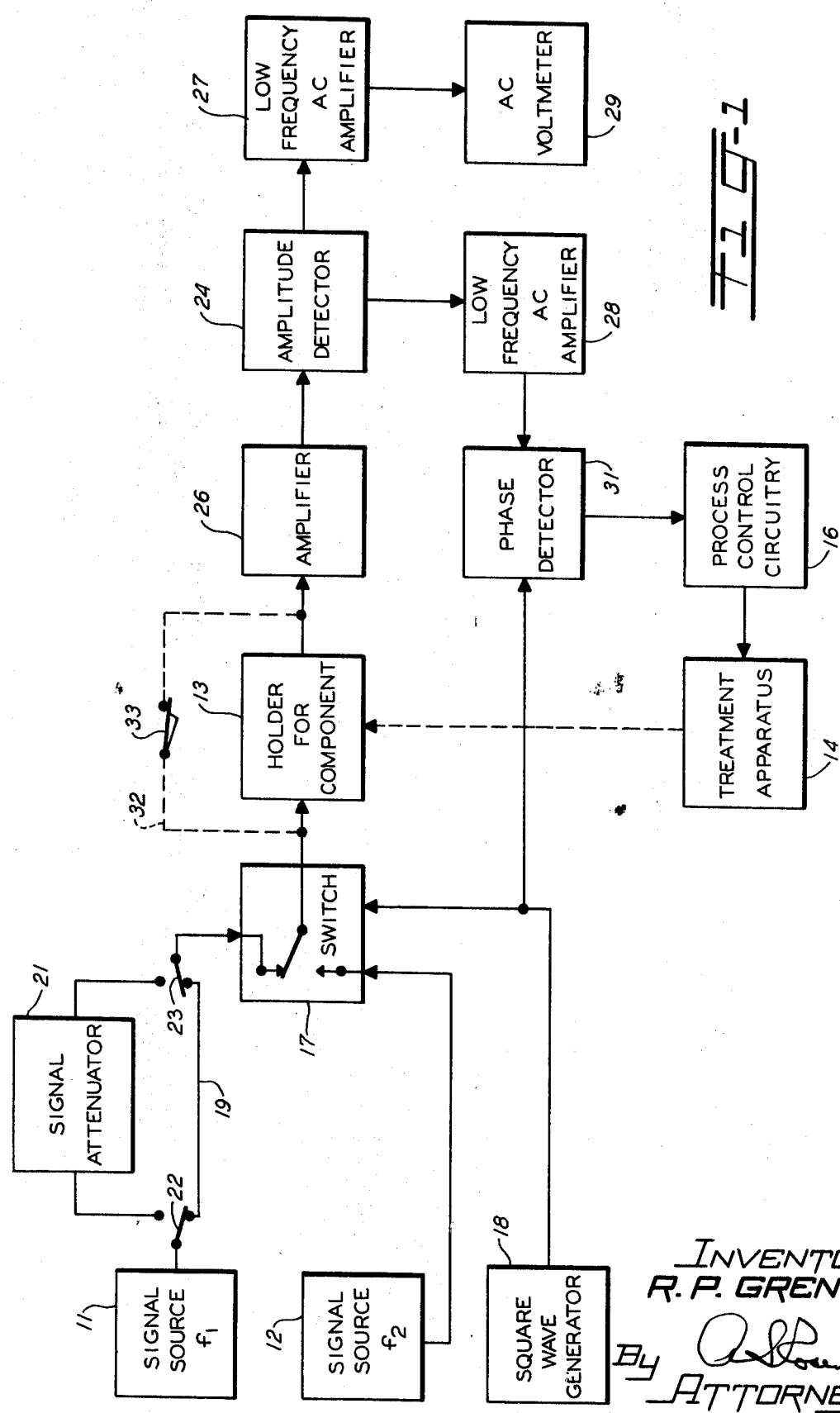
FIGS. 1 and 2 are block diagrams of alternative embodiments of a system constructed in accordance with the principles of the invention for carrying out a method of the invention for adjusting frequency response characteristics of electrical components, such as crystal filters.

Referring to FIG. 1 of the drawing, there is illustrated an arrangement for testing and adjusting the response of a crystal filter or other electrical component to input signals at two frequencies of interest, $f_1$ and $f_2$, so as to provide to the crystal filter a desired differential insertion loss between the resulting output signals. Two conventional signal sources 11 and 12 provide the signals at the respective frequencies $f_1$ and $f_2$ and at adjustable output levels. Typically, the two signal frequencies may be 8, 155, 200 Hz. and 8, 154, 200 Hz., while the desired differential insertion loss may be 3 db. The 3 db. differential insertion loss value will be used as an example in the following discussion.

A filter holder 13 is provided for the crystal filter, which filter may be composed of a material such as quartz. The crystal filter is to be treated by appropriate treatment apparatus 14 for adjusting the response of the filter toward the desired differential insertion loss characteristic. Such treatment apparatus 14 may, by way of example, apply an adjusting medium, e.g., evaporated or sputtered gold, to the crystal filter under the control of any suitable process control circuitry 16. The method and apparatus of the invention will operate to detect the response of the crystal filter to the input signals provided by the signal sources 11 and 12 and to generate a control signal, causing the process control circuitry 16 to effect a termination of the adjustment operation by the treatment apparatus 14, when the crystal filter has acquired the desired differential insertion loss characteristic.

The illustrative apparatus of FIG. 1 includes a switch 17 operable between two conditions under the control of a conventional square wave generator 18. In a first condition of the switch 17, the signal source 11 will be coupled to the filter holder 13, either directly through a line 19 or through a 3 db. attenuator pad 21, depending upon the condition of a pair of associated switches 22 and 23. In a second condition of the switch 17, the signal source 12 will be coupled to the filter holder 13. The square wave generator will function to alternate the switch 17 between these two conditions. It should be noted that the attenuator pad will attenuate the signal from the source 11, when coupled to this source, by a value equal to that desired for the differential insertion loss, i.e., 3 db.

Also included in the apparatus of FIG. 1 is a conventional signal amplitude detector 24, which is coupled to receive output signals from the crystal filter in the holder 13 through an amplifier 26. Two low frequency AC amplifiers 27 and 28 are coupled to receive output signals from the amplitude detector 24. The amplifier 27 is, in turn, coupled to an AC voltmeter 29, while the amplifier 28 is coupled to a conventional phase detector 31. The arrangement is such that the phase detector 31 will be utilized to provide the control signal to the process control circuitry 16 for terminating the adjustment operation by the treatment apparatus 14.

Figure 3:
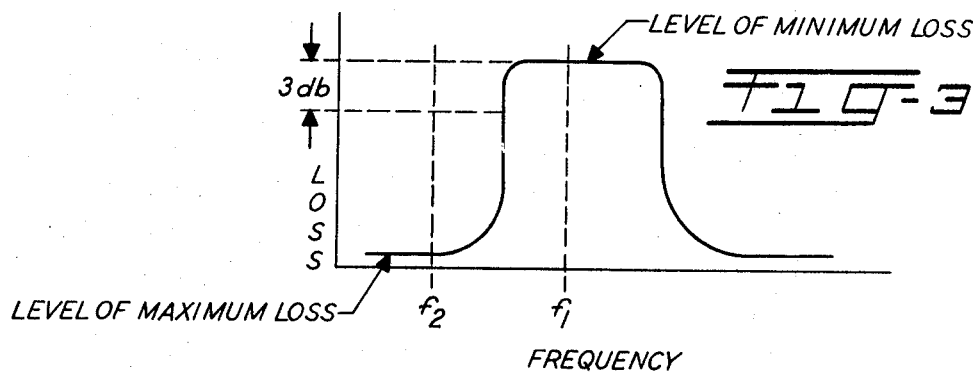
FIGS. 3 through 5 are insertion loss versus frequency curves illustrating a typical crystal filter during various phases of operation of the systems of FIGS. 1 and 2.
Figure 4:
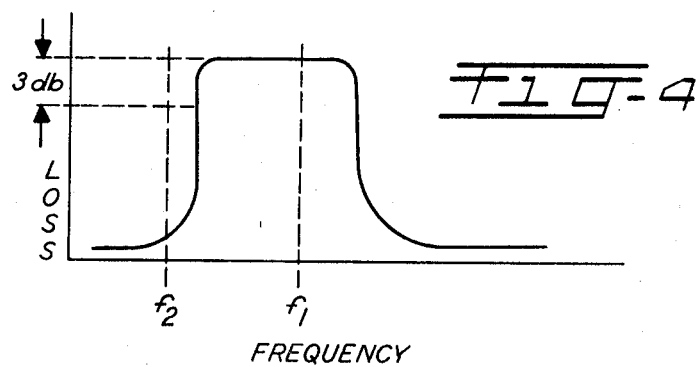
Figure 5:
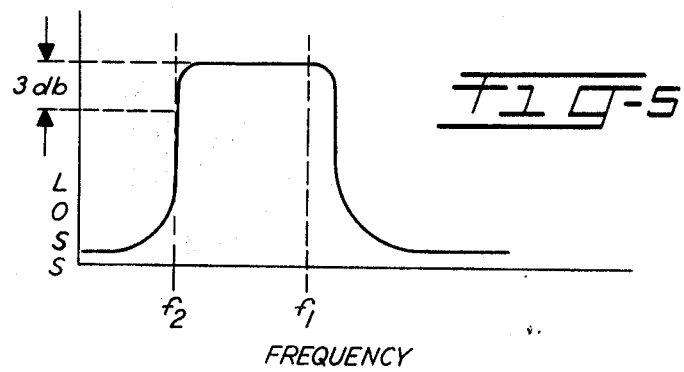

Turning now to FIGS. 3—5 of the drawing, it is desired that an exemplary differential insertion loss of 3 db. be provided by a treated crystal filter when input signals at frequencies $f_1$ and $f_2$ are applied to the filter. This condition is illustrated in the insertion loss versus frequency curve of FIG. 5.

A typical initial characteristic curve of a quartz crystal filter unit is shown in FIG. 3. The differential insertion loss is, clearly, much greater than the desired 3 db. value with respect to $f_1$ and $f_2$ input signals. By appropriate treatment of the filter, a relatively high insertion loss portion of the characteristic curve may be shifted downwardly in frequency from the position shown in FIG. 3, through a number of intermediate stages such as that illustrated in FIG. 4, so as to provide the desired insertion loss versus frequency relationship depicted in FIG. 5.

This shift may be provided by deposition of gold or another material onto the quartz crystal, the mass of the deposited material affecting the frequency response characteristics of the filter.

A typical method of operating the exemplary apparatus of FIG. 1, in accordance with the principles of the invention, involves an initial calibration procedure. The signal source 11 is coupled initially directly to the switch 17 through the line 19, the associated switches 22 and 23 being positioned in the depicted condition of FIG. 1. The square wave generator 18 is now operated, causing the switch 17 to couple alternatingly or sequentially to the holder 13 the first input signal from the signal source 11 at frequency $f_1$ and the second input signal from the signal source 12 at frequency $F_2$. The holder 13 is presently short circuited, e.g., through a crystal filter bypass line 32 associated with the holder, such that the two signals are coupled sequentially to the amplitude detector 24 and the AC voltmeter 29, while bypassing a crystal filter retaining portion of the holder 13. The system is calibrated by increasing or decreasing the output level of one of the sources 11 and 12 until equal output signal amplitudes corresponding to the two sequentially applied input signals are observed at the amplitude detector 24, as represented by a zero voltage reading on the AC voltmeter 29.

The calibrated system may now be utilized to adjust a crystal filter, initially having the loss versus frequency curve of FIG. 3, to provide the desired insertion loss versus frequency curve of FIG. 5. The crystal filter to be adjusted is introduced into the filter holder 13, while the bypass line 32 is disconnected, e.g., by operating a switch 33. Thus, the filter will be coupled through the amplifier 26 to the insertion loss monitoring and treatment control portions of the system.

The associated switches 22 and 23 are, meanwhile, operated to an opposite condition from that illustrated in FIG. 1. In this manner, the signal source 11 of the frequency $f_1$ signal is coupled to the switch 17 through the switch 22, the 3 db. signal attenuator 21 and the switch 23. Operation of the switch 17 under the control of the square wave generator will now couple the unattenuated $f_2$ frequency signal and the $f_1$ frequency signal, attenuated by 3 db. alternatingly to the holder 13 for the crystal filter to be adjusted.

The apparatus is presently in a condition of operation suitable for crystal filter treatment, i.e., with the signal attenuator 21 coupled between the signal source 11 and the switch 17, with a crystal filter to be adjusted positioned in the filter holder 13 and with the switch 33 operated to couple signals from the switch 17 to the held crystal. The treatment apparatus 14 is now rendered effective to commence treating the crystal filter, e.g., by vacuum deposition or sputtering of gold onto the filter, to vary the characteristic curve of FIGS. 3 through 5 in a manner toward attaining the desired FIG. 5 condition.

Referring next to FIGS. 6 through 10, several sample waveforms are depicted. FIG. 6 represents the effect of the square wave generator 18 and the signal attenuator 21 upon the output from the switch 17. The two input signals, at frequencies $f_1$ and $f_2$, are alternatingly applied to the crystal filter in the holder 13 at a 3 db. signal level differential.

FIG. 7 illustrates the output from the crystal filter applied to the amplitude detector 24 at the start of the adjustment operation provided by the treatment apparatus 14. The insertion loss property of the filter at the frequency $f_2$, as may also be observed from FIG. 3, initially exceeds that at frequency $f_1$ by an amount greater than 3 db. The FIG. 7 waveform takes into account the 3 db. attenuation in the signal level of the frequency $f_1$ input signal, still indicating the presence of a signal level output greater at frequency $f_1$ than at frequency $f_2$.

FIG. 8 represents the situation which would occur if treatment were not terminated upon attainment of the desired 3 db. differential insertion loss, i.e., at the FIG. 5 stage. Thus, the output of the treated crystal filter would become greater at frequency $f_2$ than at frequency $f_1$, due to the effect of the 3 db. attenuation of the frequency $f_1$ signal, since the true differential insertion loss of the treated crystal filter would be less than 3 db. This may be seen by observing the trend of the curves of FIGS. 3 through 5.

FIGS. 9 and 10 depict the amplitude detector output waveforms corresponding to the crystal filter output waveforms of FIGS. 7 and 8, respectively. These waveforms represent instantaneous differential signal level curves for alternating output signals corresponding to alternated input signals at the two frequencies $f_1$ and $f_2$. A phase reversal may be noted between the FIG. 9 and FIG. 10 conditions. This phase reversal takes place, obviously, at the instant when the 3 db. calibrated input signal level difference is matched by the differential insertion loss for the frequency $f_1$ and $f_2$ input signals applied to the crystal filter in the holder 13. It is, thus, at the moment of phase reversal that the treatment operation must be terminated.

The amplitude detector 24 continuously provides an AC monitoring signal, corresponding initially to the waveform of FIG. 9 through the low frequency AC amplifier 28 to the phase detector 31. Upon the phase detector sensing a phase reversal in the AC monitoring signal, the phase detector provides a control signal to the process control circuitry 16, terminating the adjustment process provided by the treatment apparatus 14. The differential insertion loss of the crystal is, thus, fixed at the desire 3 db. level of FIG. 5.

Figure 2:
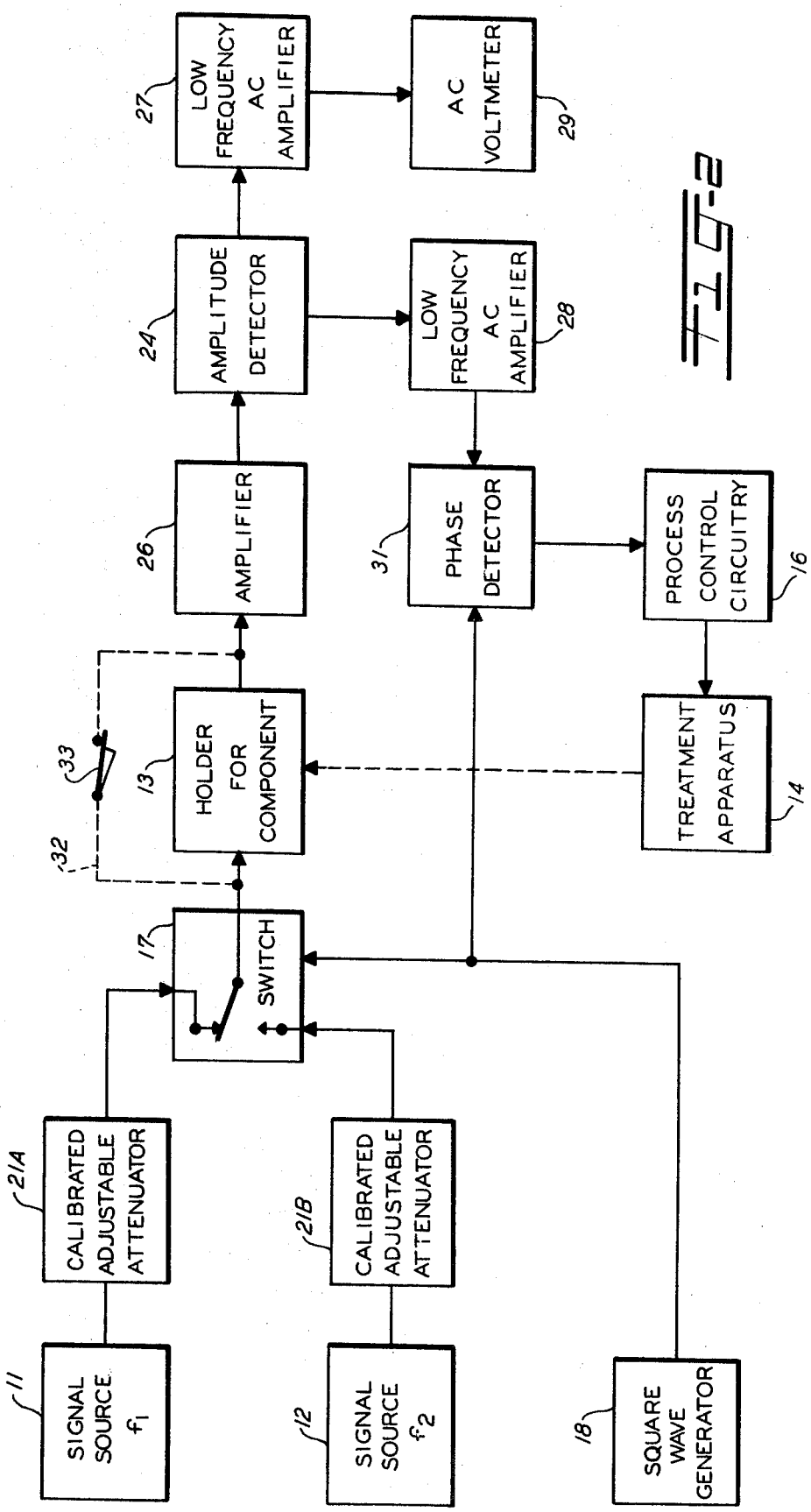

Turning now to FIG. 2 of the drawing, there is illustrated a modified arrangement of apparatus provided in accordance with the principles of the invention. The system of FIG. 2 is essentially similar to that of FIG. 1 in most respects. Thus, elements 11, 12, 13, 14, 16, 17, 18, 24, 26, 27, 28, 29, 31, 32 and 33 are virtually identical, and are designated by like reference numerals, in both FIG. 1 and FIG. 2.

The embodiment of FIG. 2 departs from that of FIG. 1 in that the line 19, the attenuator pad 21 and the associated switches 22 and 23 of the FIG. 1 arrangement are not utilized. These are replaced, in the system of FIG. 2, by two calibrated adjustable attenuators 21A and 21B coupled between the signal source 11 or 12, respectively, and the switch 17.

The operation of the FIG. 2 embodiment is substantially similar to that of FIG. 1. Either or both of the calibrated adjustable attenuators 21A and 21B may be adjusted during an initial calibration operation to provide a desired initial differential signal output level, e.g., 3 db. The treatment operation may then take places as previously described for the FIG. 1 embodiment.

It is to be understood that the described apparatus and method are simply illustrative of two alternative embodiments of the invention. Many modifications may be made in accordance with the disclosed principle of the invention. Thus, the technique involved may be adapted to control any frequency-responsive characteristic of an electrical component. Additionally, a modification of the described method might be provided by calibrating a system similar to that of FIG. 1 while a 'db. signal attenuator device is coupled in series with one of the input signals. Cessation of such attenuation would provide the desired 3 db. signal level difference during a subsequent treatment operation.

What I claim is:

1. In a method of adjusting an electrical component so as to provide a predetermined differential insertion loss with respect to output signals corresponding to two input signals generated at two different frequencies of interest, the steps of:

applying the two input signals sequentially to the electrical component with the signal levels of the two signals calibrated to differ by a quantity equal to the predetermined differential insertion loss; while treating the component so as to vary the response of the electrical component to at least one of the frequencies; and while detecting the differential signal level between output signals of the electrical component corresponding to the two frequencies;

generating a control signal upon the detected differential signal level attaining a value of zero; and terminating the treating step upon generation of the control signal.

2. In a method as set forth in claim 1, said detecting and control signal generating steps comprising:

generating an AC monitoring signal corresponding to the sequential signal levels transmitted by the electrical component as the two input signals are applied sequentially to the electrical component;

detecting a phase reversal in the AC monitoring signals; and generating the control signal in response to the phase reversal detection.

3. In a method of utilizing a signal amplitude measuring device in adjusting an electrical component to provide a predetermined differential insertion loss between output signals corresponding to two input signals generated initially at like amplitude but at two different frequencies of interest, the steps of:

a. coupling one of the input signals in series through the electrical component to the amplitude measuring device; then b. measuring the amplitude of said one signal; next c. decoupling said one input signal from the measuring device; thereupon d. coupling the other of the input signals in series through the electrical component to the amplitude measuring device through a signal attenuator selected to attenuate said other input signal by an amount equal to the predetermined differential insertion loss; then e. measuring the amplitude of said other signal; and then f. decoupling said other signal from the amplitude measuring devices; thereupon g. repeatingly performing steps (a) through (f) a number of times; while altering a characteristic of the electrical component affecting the differential insertion loss until equal output signal amplitudes are measured by the amplitude measuring device.

4. In a method as set forth in claim 3, said altering step comprising:

treating the electrical component in a manner selected to vary said characteristic of the electrical component; while generating an AC monitoring signal corresponding to the alternating amplitudes measured by the amplitude measuring device as the two input signals are applied alternatingly to the electrical component;

generating a control signal in response to a phase reversal of the AC monitoring signal; and terminating the treatment of the electrical component in response to generation of the control signal.

5. In a method of utilizing a signal amplitude measuring device in adjusting an electrical component so as to provide a predetermined differential insertion loss between output signals corresponding to two input signals generated at two different frequencies of interest, the steps of:

coupling the two input signals sequentially to the amplitude measuring device;

adjusting the relative amplitudes of the input signals to provide equal output signal amplitudes as measured by the amplitude measuring device; thereupon coupling the two input signals sequentially to the electrical component with one of the input signals so coupled through a signal attenuator selected to attenuate said one input signal by an amount equal to the predetermined differential insertion loss; and coupling the electrical component to the amplitude measuring device; and thereupon altering a characteristic of the electrical component affecting the differential insertion loss until equal output signal amplitudes are measured by the amplitude measuring device.

6. In a method as set forth in claim 5, said altering step comprising:

treating the electrical component in a manner selected to vary said characteristic of the electrical component; while generating an AC monitoring signal corresponding to the alternating amplitudes measured by the amplitude measuring device as the two input signals are applied alternatingly to the electrical component; and terminating the treating of the electrical component upon the occurrence of a phase reversal in the AC monitoring signal.

7. In a method as set forth in claim 6, said treating and terminating steps comprising:

applying a characteristic adjusting medium to the electrical component;

generating a control signal in response to a phase reversal in the AC monitoring signal; and discontinuing application of the characteristic adjusting medium to the electrical component in response to generation of the control signal.

8. In a system for adjusting an electrical component so as to provide a predetermined differential insertion loss between output signals corresponding to two input signals having two frequencies of interest:

means for generating signals having both of said frequencies of interest and including calibrating adjustment means for varying the output level of at least one of the two signals;

means for attenuating a selected on of said signals by a quantity equal to the predetermined differential insertion loss;

means for detecting the amplitude of an output signal from the electrical component;

coupling means for selectively coupling the two signals in an alternating manner to said amplitude detecting means externally of the electrical component during a calibrating phase of operation of the coupling means and for selectively coupling the two signals in an alternating manner through the electrical component to the amplitude detecting means during a treatment phase of operation of the coupling means, said coupling means, including switching means selectively operable between two conditions of operation for coupling the amplitude detecting means to receive said selected on signal bypassing the signal attenuating means in the calibrating phase of operation of the coupling means and for coupling the electrical component and the amplitude detecting means to receive said selected one signal through the attenuating means in the treatment phase of operation of the switching means;

means, initiated into operation during said treatment phase of the coupling means, for treating the electrical component so as to alter a characteristic affecting the differential insertion loss; and means responsive to an equalization of the alternating amplitudes detected by the amplitude detecting means upon application to the electrical component of the two input signals alternatingly during said treatment phase of the coupling means for terminating the operation of the treating means.

9. In a system as set forth in claim 8, said terminating means comprising:

means responsive to the alternating amplitudes detected by the amplitude detecting means as the two signals are applied alternatingly to the electrical component for generating an AC monitoring signal corresponding to said detected alternating amplitudes; and means responsive to a phase reversal in said AC signal for discontinuing the operation of the treating means.